US008765315B2

(12) United States Patent
Kumada et al.

(10) Patent No.: US 8,765,315 B2
(45) Date of Patent: Jul. 1, 2014

(54) FUEL CELL SYSTEM AND METHOD OF CONTROLLING FUEL CELL SYSTEM

(75) Inventors: Mitsunori Kumada, Yokosuka (JP); Ryoichi Shimoi, Yokohama (JP); Hayato Chikugo, Yokosuka (JP); Takashi Aoyama, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 665 days.

(21) Appl. No.: 13/061,277

(22) PCT Filed: Jun. 15, 2009

(86) PCT No.: PCT/JP2009/060831
§ 371 (c)(1),
(2), (4) Date: Feb. 28, 2011

(87) PCT Pub. No.: WO2010/026819
PCT Pub. Date: Mar. 11, 2010

(65) Prior Publication Data
US 2011/0159390 A1    Jun. 30, 2011

(30) Foreign Application Priority Data

Sep. 4, 2008 (JP) ................. 2008-226834
Apr. 24, 2009 (JP) ................. 2009-106916

(51) Int. Cl.
*H01M 8/04* (2006.01)
(52) U.S. Cl.
USPC ........................................ 429/429
(58) Field of Classification Search
CPC ............ H01M 8/04231; H01M 8/04223; H01M 8/04238; H01M 8/04955
USPC .................. 429/413, 414, 429, 432, 444, 535
See application file for complete search history.

(56) References Cited

U.S. PATENT DOCUMENTS

| | | | |
|---|---|---|---|
| 6,635,370 B2 | 10/2003 | Condit et al. | |
| 7,132,179 B2 * | 11/2006 | St-Pierre et al. | 429/413 |
| 7,195,830 B2 | 3/2007 | Kobayashi et al. | |
| 2002/0098396 A1 | 7/2002 | Kobayashi et al. | |
| 2002/0182456 A1 | 12/2002 | Condit et al. | |
| 2006/0046106 A1 * | 3/2006 | Yu et al. | 429/13 |
| 2010/0233563 A1 | 9/2010 | Katano et al. | |

FOREIGN PATENT DOCUMENTS

| | | |
|---|---|---|
| JP | 06-333586 A | 12/1994 |
| JP | 2002-222658 A | 8/2002 |

(Continued)

OTHER PUBLICATIONS

Machine Translation in English of JP 2003130291 A.*

*Primary Examiner* — Barbara Gilliam
*Assistant Examiner* — Claire L Roe
(74) *Attorney, Agent, or Firm* — Foley & Lardner LLP

(57) ABSTRACT

Deterioration at the start-up and deterioration during the leaving period are suppressed in a good balance. As a system shutdown process, a controller (30) causes consumption of the air (oxygen) present in an oxidant electrode of a fuel cell stack (1) (oxygen consumption control). Further, after the termination of the oxygen consumption control, the controller (30) performs control to set a medium pressure hydrogen valve (13) and a hydrogen pressure adjustment valve (14) in a closed state. The controller (30) thereby causes hydrogen to be held in a passage located between the medium pressure hydrogen valve (13) and the hydrogen pressure adjustment valve (14). During a system shutdown period, a predetermined amount of hydrogen (medium pressure hydrogen) held in the hydrogen supply passage (L1) at a position between the medium pressure hydrogen valve (13) and the hydrogen pressure adjustment valve (14) can be supplied to the fuel electrode of the fuel cell stack (1) through a bypass passage (L2).

7 Claims, 7 Drawing Sheets

(56) References Cited

FOREIGN PATENT DOCUMENTS

| | | | | |
|---|---|---|---|---|
| JP | 2003130291 A | * | 5/2003 | ............... F17C 5/06 |
| JP | 2004-014213 A | | 1/2004 | |
| JP | 2004-079451 A | | 3/2004 | |
| JP | 2004-333027 A | | 11/2004 | |
| JP | 2005-158553 A | | 6/2005 | |
| JP | 2005-518632 A | | 6/2005 | |
| JP | 2006-156320 A | | 6/2006 | |
| JP | 2008-041265 A | | 2/2008 | |
| JP | 2008-140772 A | | 6/2008 | |

* cited by examiner

FUEL CELL SYSTEM AND METHOD OF CONTROLLING FUEL CELL SYSTEM

The present application is a National Stage Entry of International Application PCT/JP2009/060831, filed on Jun. 15, 2009, the disclosure of which is incorporated by reference herein in its entirety.

TECHNICAL FIELD

The present invention relates to a fuel cell system and a method of controlling the fuel cell system.

BACKGROUND ART

Heretofore, a fuel cell is known which generates power by making a fuel gas (hydrogen, for example) supplied to a fuel electrode and an oxidant gas (the air, for example) supplied to an oxidant electrode electrochemically react with each other. In a fuel cell system including the fuel cell, the air is sometimes present in both the oxidant electrode and the fuel electrode at a start-up. In this case, a boundary between the air present in the fuel electrode and hydrogen newly supplied thereto, so-called a hydrogen front may deteriorate the fuel cell. More specifically, corrosion of a carbon support supporting a catalyst of platinum or the like may possibly occur.

For example, Patent Literature 1 discloses a shutdown method for fuel cell. According to this method, oxygen and hydrogen in the fuel cell are made to react with each other with the air flow to the oxidant electrode being shut off. Thereby, the concentration of oxygen remaining in the oxidant electrode is reduced and the concentration of hydrogen in the fuel cell is increased until no oxygen remains in the fuel electrode and the oxidant electrode and the gas composition within the fuel electrode and the oxidant electrode comes to an equilibrium gas composition of at least 0.0001% hydrogen with balance fuel cell inert gases. Upon reach of the equilibrium gas composition, the gas composition of at least 0.0001% hydrogen with balance fuel cell inert gases is maintained during system shutdown. Specifically, during a period after the system shutdown until the next start-up (leaving period), a hydrogen concentration in the fuel cell is monitored and hydrogen is supplied to the fuel cell as needed.

CITATION LIST

Patent Literature

[PTL1]
PLT 1: Published Japanese Translation of PCT International Application No. 2005-518632

SUMMARY OF INVENTION

Technical Problem

Meanwhile, the method disclosed in Patent Literature 1 enables suppressing the deterioration at the start-up due to the hydrogen front. However, this method requires the monitoring of a hydrogen concentration and control over a hydrogen supply operation during the leaving period, causing inconvenience such as a decrease in system efficiency. Further, during the leaving period, hydrogen peroxide is generated by the reaction of hydrogen in the fuel cell with the air entering through a sealing portion. This hydrogen peroxide is also one of factors causing deterioration of the fuel cell. Since the deterioration during the leaving period accumulates in proportion to the leaving period, the deterioration tends to progress as the leaving period gets longer.

The present invention has been made in view of the above circumstances, and has an object to suppress the deterioration at the start-up and the deterioration during the leaving period in a good balance.

Solution to Problem

To address the above problem, in the present invention, control means executes, in shutdown of a system, a shutdown process in which gas consumption control is made such that an oxidant gas present in an oxidant electrode is consumed in a state where a fuel gas is supplied to a fuel electrode and the supply of an oxidant gas to an oxidant electrode is shut off. The control means also executes control such that the supply of the fuel gas to the fuel electrode is terminated after a lapse of a predetermined period since termination of the shutdown process.

Advantageous Effects of Invention

Since the start-up frequency corresponding to a short system shutdown period tends to be high, in a range where a system shutdown period is short, it is preferable to suppress the deterioration at the start-up the degree of which depends on the start-up frequency. According to the present invention, the fuel gas can be supplied to the fuel electrode for a predetermined period after the termination of the shutdown process. Accordingly, an increase of the concentration of the oxidant gas in the fuel electrode is suppressed in the range where the system shutdown period is short. Even if the system is started up under the above condition, the deterioration at the start-up can be suppressed because the problem of so-called the hydrogen front is eased.

On the other hand, since the start-up frequency corresponding to a long system shutdown period tends to be low, in a range where the system shutdown period is long, it is preferable to suppress the deterioration during the leaving period the degree of which depends on the system shutdown period. According to the present invention, the supply of the fuel gas ends after a lapse of the predetermined period, and the fuel gas in the fuel electrode is consumed by the entering outside air. Accordingly, the presence of the fuel gas in the fuel electrode is suppressed in the range where the system shutdown period is long. Because the generation of hydrogen peroxide is suppressed under the above condition, the deterioration during the leaving period can be suppressed.

Thus, the deterioration at the start-up and the deterioration during the leaving period can be suppressed in a good balance by suppressing a larger factor causing deterioration between the deterioration at the start-up and the deterioration during the leaving period, depending on the length of the system shutdown period.

BRIEF DESCRIPTION OF DRAWINGS

FIG. 1 is a block diagram schematically showing the configuration of a fuel cell system according to a first embodiment.

FIG. 2 is a flowchart showing procedures of a method of controlling the fuel cell system.

FIG. 3 is a diagram illustrating a relation among a leaving period Ts, a gas concentration, and the degree of deterioration.

FIG. 4 is a diagram illustrating a system leaving period and system start-up frequency.

FIG. 5 is a diagram illustrating the transition of the amount of electric charge consumption Cc, that of an oxygen concentration Co in a fuel cell stack 1, and that of a hydrogen concentration Ch in a fuel electrode.

FIG. 6 is a block diagram schematically showing a modified example of the fuel cell system according to the first embodiment.

FIG. 7 is a block diagram schematically showing another modified example of the fuel cell system according to the first embodiment.

FIG. 8 is a block diagram schematically showing the configuration of a fuel cell system according to a second embodiment.

DESCRIPTION OF EMBODIMENTS

Figure 1:
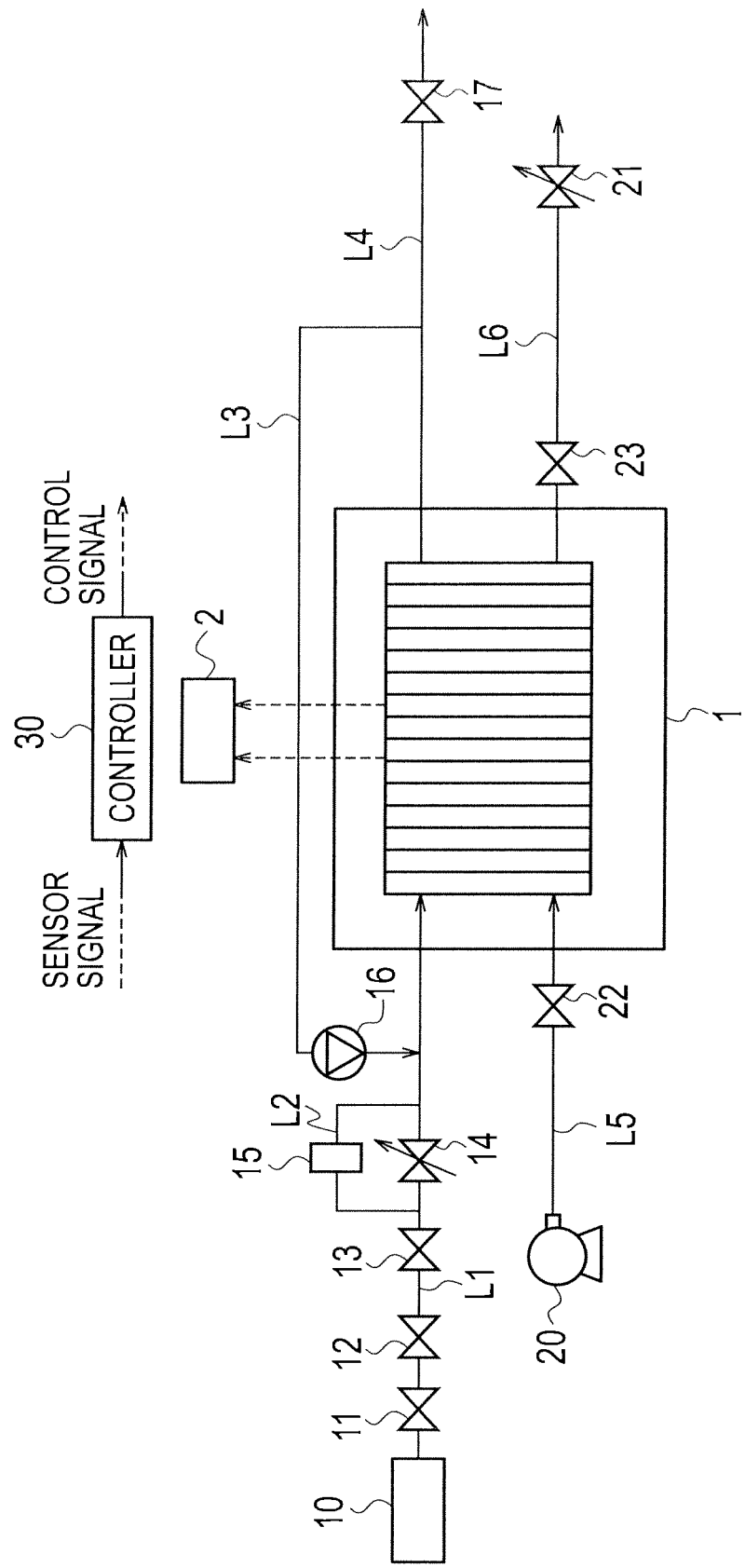
[FIG. 1]

FIG. 1 is a block diagram schematically showing a configuration of a fuel cell system according to a first embodiment of the present invention. For example, the fuel cell system is mounted on a vehicle which is a mobile unit, and the vehicle is driven by electric power supplied from the fuel cell system.

The fuel cell system includes a fuel cell stack (fuel cell) 1 formed of multiple fuel cell structures stacked on one another with separators interposed therebetween. Each fuel cell structure has a fuel electrode and an oxidant electrode facing each other with a solid polymer electrolyte membrane interposed therebetween. In the fuel cell stack 1, the fuel electrode is supplied with a fuel gas while the oxidant electrode is supplied with an oxidant gas. The fuel cell stack 1 thereby makes the fuel gas and the oxidant gas electrochemically react with each other to generate power. In this embodiment, description is given of a case where hydrogen is used as a fuel gas and the air is used as an oxidant gas.

The fuel cell system includes a hydrogen system for supplying the fuel cell stack 1 with hydrogen, and an air system for supplying the fuel cell stack 1 with the air.

In the hydrogen system, hydrogen which is a fuel gas is supplied from fuel gas supply means to the fuel cell stack 1 through a hydrogen supply passage L1. Specifically, hydrogen is stored in a fuel tank (fuel gas supply means) 10 such as a high-pressure hydrogen cylinder, for example, and is supplied from the fuel tank 10 to the fuel cell stack 1 through the hydrogen supply passage L1.

In the hydrogen supply passage L1, a tank main valve 11 is provided downstream of the fuel tank 10, and a pressure reducing valve 12 is provided downstream of the tank main valve 11. Hydrogen in the fuel tank 10 is supplied to the hydrogen supply passage L1 when the state of the tank main valve 11 is changed to an open state, and pressure of which is mechanically reduced to a predetermined pressure by the pressure reducing valve 12. Moreover, in the hydrogen supply passage L1, a medium pressure hydrogen valve 13 is provided downstream of the pressure reducing valve 12, and a hydrogen pressure adjustment valve 14 is provided downstream of the medium pressure hydrogen valve 13. The hydrogen pressure adjustment valve 14 has its opening degree (i.e., opening area, which is included in a mode of open/closed state) controlled by a controller 30 described later, and thus adjusts the pressure of hydrogen in the fuel electrode of the fuel cell stack 1 so that the pressure of hydrogen may be a desired pressure.

Further, a bypass passage L2 is provided on the fuel supply passage L1. One end of the bypass passage L2 is connected to the fuel supply passage L1 at a position between the medium pressure hydrogen valve 13 and the hydrogen pressure adjustment valve 14. The other end of the bypass passage L2 is connected to the fuel supply passage L1 at a position between the hydrogen pressure adjustment valve 14 and the fuel cell stack 1. In the bypass passage L2, flow rate limitation means 15 is provided which is used to limit the flow rate of hydrogen supplied through the bypass passage L2. As an example of the flow rate limitation means 15, an orifice which reduces the passage diameter of the bypass passage L2 can be used. The flow rate of hydrogen allowed by the flow rate limitation means 15 is set equal to or smaller than a minimum flow rate of hydrogen that the fuel cell stack 1 consumes during system operation.

A gas discharged from each fuel electrode in the fuel cell stack 1 (gas containing unused hydrogen) is discharged to a hydrogen circulation passage L3. The other end of the hydrogen circulation passage L3 is connected to the hydrogen supply passage L1 at a position downstream of the end, on the downstream side, of the bypass passage L2 at which the bypass passage L2 is connected to the hydrogen supply passage L1. Hydrogen circulation means such as a hydrogen circulation pump 16, for example, is provided in the hydrogen circulation passage L3. The gas discharged from the fuel cell stack 1 is circulated by the hydrogen circulation means so as to be brought back to the fuel cell stack 1.

Meanwhile, in the case of using the air as an oxidant gas, impurities (such as nitrogen) contained in the air supplied to the oxidant electrode are sometimes transmitted to the fuel electrode. This increases the concentration of impurities in a circulation system including the fuel electrode and the hydrogen circulation passage L3, likely causing a reduction in the partial pressure of hydrogen. Since the high impurity concentration causes inconvenience such as a reduction in the output of the fuel cell stack 1, the impurity concentration in the circulation system needs to be managed.

Thus, a purge passage L4 for purging impurities from the circulation system is provided on the hydrogen circulation passage L3. A purge valve 17 is provided in the purge passage L4. Controlling the open/closed state of the purge valve 17 enables discharging a circulation gas flowing through the hydrogen circulation passage L3 to the outside, thereby enabling the purge of impurities. The purge of impurities enables the adjustment of the impurity concentration in the circulation system.

In the air system, the air which is an oxidant gas is supplied from air supply means to the fuel cell stack 1 through an air supply passage L5. Specifically, a compressor 20 is provided in the air supply passage L5. The compressor 20 takes in the atmosphere (air), and compresses and discharges it. The compressed air is supplied to the fuel cell stack 1.

A gas discharged from each oxidant electrode in the fuel cell stack 1 (the air from which oxygen is consumed) is discharged to the outside through an air discharge passage L6. An air pressure adjustment valve 21 is provided in the air discharge passage L6. The air pressure adjustment valve 21 adjusts the pressure of the air in the oxidant electrode of the fuel cell stack 1.

Further, a shutoff valve 22 is provided in the air supply passage L5 on a side close to the inlet of the fuel cell stack 1.

The shutoff valve 22 shuts off the passage in its closed state. Meanwhile, a shutoff valve 23 is provided in the air discharge passage L6 on a side close to the outlet of the fuel cell stack 1. The shutoff valve 23 shuts off the passage in its closed state. As will be described later, control is performed to set these shutoff valves 22 in an open state during the system operation, but control is performed as needed to set these shutoff valves 22 in a closed state. The control to set the valves in a closed state regulates the entry of the outside air into the fuel cell stack 1.

An output extraction device 2 is connected to the fuel cell stack 1. The output extraction device 2 controls the output (for example, current) extracted from the fuel cell stack 1. The power generated in the fuel cell stack 1 is supplied, through the output extraction device 2, to a load such as an electric motor for driving a vehicle.

The controller (control means) 30 functions to control the entire system integrally. The controller 30 operates in accordance with a control program to control the operation state of the system. As the controller 30, a microcomputer mainly formed of a CPU, a ROM, a RAM, and an I/O interface may be used. The controller 30 executes various calculations on the basis of the state of the system, and outputs the calculation result to various actuators (not shown) as a control signal. The controller 30 thereby controls the state of each of the various valves 11 to 14, 17, and 21 to 23, the speed of rotation of each of the hydrogen circulation pump 16 and the compressor 20, and current extracted by the output extraction device 2.

The controller 30 receives inputs of sensor signals from various sensors and the like in order to detect the state of the system. For example, the controller 30 can specify, on the basis of the sensor signals, the flow rate of or the pressure of hydrogen and the air supplied to the fuel cell stack. The controller 30 can also specify, on the basis of the sensor signals, extraction current actually extracted from the fuel cell stack 1, the total voltage of the fuel cell stack 1, and a cell voltage per unit power generation cell constituting the fuel cell stack 1.

The controller 30 executes shutdown processes to be executed in shutdown of the system, which is related to this embodiment. In this specification, the shutdown of the system indicates a state where substantial control related to the power generation operation by the fuel cell stack 1 is terminated, more specifically, a state after the termination of the shutdown processes until the next start-up of the fuel cell system. As the shutdown processes, the controller 30 causes consumption of the air, specifically, oxygen present in the oxidant electrode of the fuel cell stack 1. Then, the controller 30 performs control to set the medium pressure hydrogen valve 13 and the hydrogen pressure adjustment valve 14 in a closed state. By the time the system transitions to shutdown through the series of shutdown processes, hydrogen is held in the passage located between the medium pressure hydrogen valve 13 and the hydrogen pressure adjustment valve 14 (the holding of medium pressure hydrogen).

Figure 2:
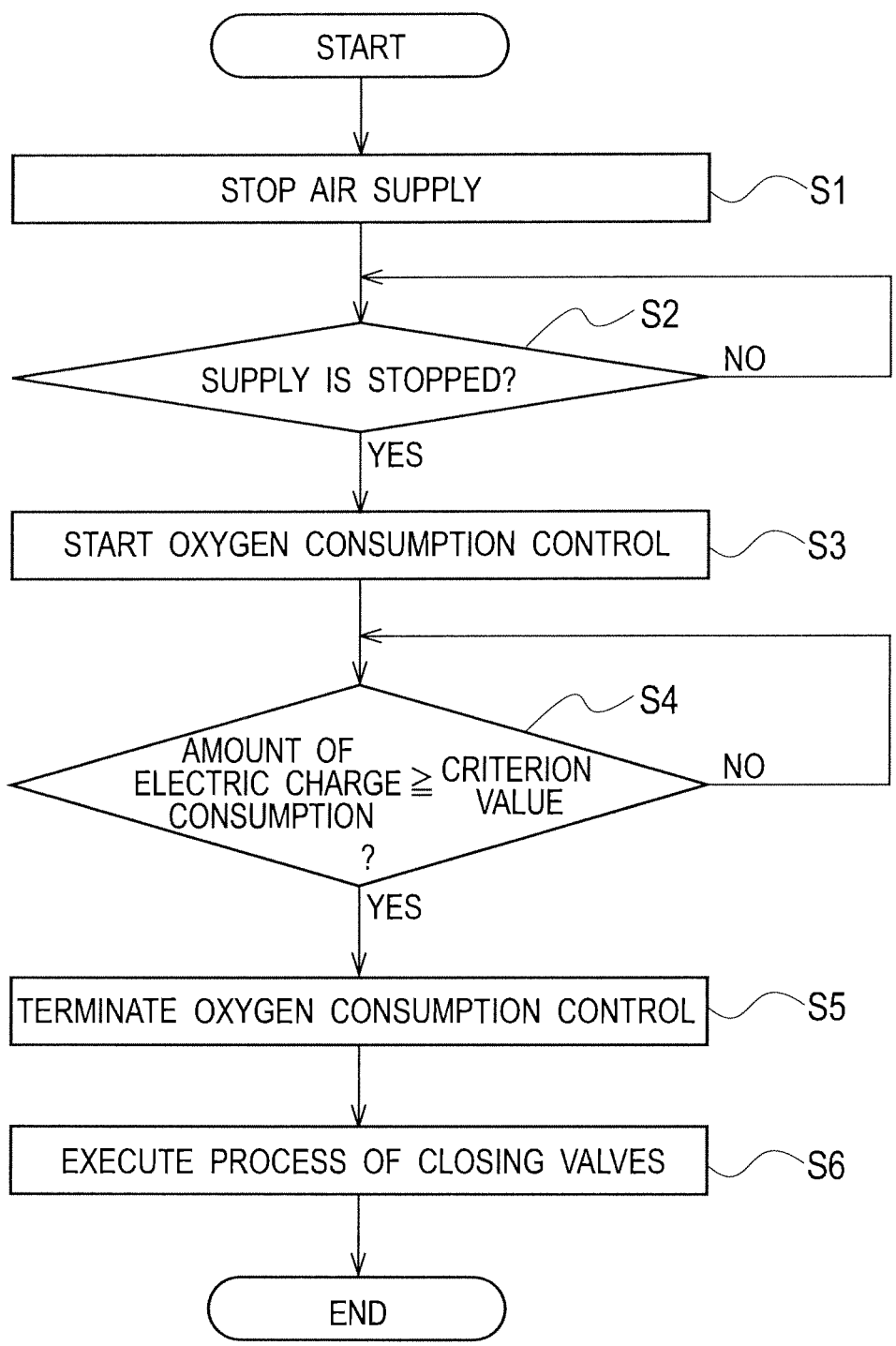
[FIG. 2]

FIG. 2 is a flowchart showing procedures of a method of controlling the fuel cell system according to the embodiment of the present invention. Processes shown in FIG. 2 represent procedures of the series of shutdown processes to be executed in shutdown of the fuel cell system, and are executed by the controller 30 by using an off signal of an ignition switch as a trigger, for example. Before the execution of the shutdown processes, hydrogen is supplied to the fuel electrode and the air is supplied to the oxidant electrode.

First of all, in Step 1 (S1), the stopping of the air supply is instructed. Specifically, the controller 30 stops the operation of the compressor 20. This shuts off the supply of the air to the oxidant electrode. Note that, in Step 1, only the air supply is stopped and the hydrogen supply is maintained.

In Step 2 (S2), it is judged whether or not the air supply has been stopped. The controller 30 judges whether or not the air supply has been stopped, by using one or more of factors such as the speed of rotation of the compressor 20, the flow rate of the air, the pressure of the air, and a length of time elapsed since the timing of the supply stop instruction.

If it is judged to be positive in Step 2, that is, if the air supply has been stopped, the process proceeds to Step 3 (S3). On the other hand, if it is judged to be negative in Step 2, that is, if the air supply has not been stopped, the judgment of Step 2 is executed again after a predetermined length of time.

In Step 3, oxygen consumption control is started. As a preliminary step of executing the oxygen consumption control (gas consumption control), the controller 30 performs control to set the shutoff valves 22 and 23 in the air system in a closed state. The controller 30 also performs control to set the purge valve 17 in the hydrogen system in a closed state.

The oxygen consumption control is control executed by extracting current from the fuel cell stack 1 through the output extraction device 2. The execution of the oxygen consumption control causes consumption of the air (oxygen) in the oxidant electrode of the fuel cell stack 1 (including the air system communicating with the oxidant electrode, in the broad sense). The controller 30 determines a current setting value which is a control instruction value for current to be extracted by the output extraction device 2, and controls the output extraction device 2 on the basis of the current setting value to extract current from the fuel cell stack 1. An optimum value for the current setting value is set in advance through experiments and simulations.

In Step 4 (S4), it is judged whether or not the amount of electric charge consumption is equal to or larger than a criterion value. The amount of electric charges consumed by the oxygen consumption control can be calculated on the basis of an integrated value of the amount of current extracted by the output extraction device 2. Meanwhile, the criterion value is a value used to judge a termination timing of the oxygen consumption control, and indicates the amount of electric charges to be consumed in the oxygen consumption control. In this embodiment, the criterion value is a variable, and is set based on a total amount of medium pressure hydrogen supplied through the bypass passage L2 during the system shutdown, as will be described later. More specifically, the criterion value is set in such a way that the amount of electric charge consumption may be smaller as the total flow rate of medium pressure hydrogen is larger.

If it is judged to be positive in Step 4, that is, if the amount of electric charge consumption is equal to or larger than the criterion value, the process proceeds to Step 5 (S5). On the other hand, if it is judged to be negative in Step 4, that is, if the amount of electric charge consumption is less than the criterion value, the judgment of Step 4 is executed again after a predetermined length of time.

In Step 5 (S5), the oxygen consumption control is terminated. Specifically, the controller 30 causes the output extraction device 2 to terminate the extraction of current.

In Step 6 (S6), a process of closing the valves in the hydrogen system is executed. Specifically, the controller 30 performs control to set the tank main valve 11, the medium pressure hydrogen valve 13, and the hydrogen pressure adjustment valve 14 in a closed state. Note that, a total amount of medium pressure hydrogen held between the medium pressure hydrogen valve 13 and the hydrogen pressure adjustment valve 14 can be adjusted by causing an offset in the timing of closing the hydrogen pressure adjustment valve 14.

When the shutdown processes formed of the series of processes described above are terminated, the system transitions to the shutdown state. More specifically, in this embodiment, as shown in the flowchart of FIG. 2, the shutdown processes are terminated by performing control to set all the valves shown in Step 6 including the tank main valve 11, the medium pressure hydrogen valve 13, and the hydrogen pressure adjustment valve 14 in a closed state, and then the system transitions to the shutdown state. Note that, the processes in Step 5 and Step 6 may be executed at a temporally equivalent timing, or may be executed in a reverse order. In the latter case, the shutdown processes are terminated by the execution of the process of Step 5.

As described above, in the fuel cell system of this embodiment, the medium pressure hydrogen valve 13 and the hydrogen pressure adjustment valve 14 are provided in the hydrogen supply passage L1. These valves 13 and 14 serve as open/close means to change the open/closed state of the passage. Further, one end of the bypass passage L2 is connected to the fuel supply passage L1 at a position between the medium pressure hydrogen valve 13 and the hydrogen pressure adjustment valve 14. The other end of the bypass passage L2 is connected to the fuel supply passage L1 at a position between the hydrogen pressure adjustment valve 14 and the fuel cell stack 1. In other words, in the hydrogen supply passage L1, the passage located between the medium pressure hydrogen valve 13 and the hydrogen pressure adjustment valve 14 and the passage located between the hydrogen pressure adjustment valve 14 and the fuel cell stack 1 communicate with each other through the bypass passage L2. In the bypass passage L2, the flow rate limitation means 15 is provided which is used to limit the flow rate of gas flowing through the passage.

With the above configuration, as the system shutdown processes, the controller 30 extracts current from the fuel cell stack 1 through the output extraction device 2 so as to cause consumption the air (oxygen) present in the oxidant electrode of the fuel cell stack 1 (oxygen consumption control). The controller 30 also performs control to set the medium pressure hydrogen valve 13 and the hydrogen pressure adjustment valve 14 in a closed state after terminating the oxygen consumption control. Accordingly, hydrogen is held in the passage located between the medium pressure hydrogen valve 13 and the hydrogen pressure adjustment valve 14.

According to the above configuration, during the system shutdown period, a given amount of hydrogen (medium pressure hydrogen) held in the hydrogen supply passage L1 between the medium pressure hydrogen valve 13 and the hydrogen pressure adjustment valve 14 can be supplied to the fuel electrode of the fuel cell stack 1 through the bypass passage L2. The supply of medium pressure hydrogen ends once the amount of hydrogen equivalent to the capacity of the passage located between the medium pressure hydrogen valve 13 and the hydrogen pressure adjustment valve 14 is supplied.

In the fuel cell system, oxygen enters the fuel electrode of the fuel cell stack 1 during the system shutdown, because the air enters from the outside through minute gaps present in each of the various valves, a sealing portion of a stack case that houses the fuel cell stack 1, and the like and oxygen is transmitted from the oxidant electrode. If the air (oxygen) is present in both the oxidant electrode and the fuel electrode at a system start-up, the fuel cell stack may possibly be deteriorated due to the presence of a hydrogen front which is a boundary between the air present in the fuel electrode and hydrogen newly supplied thereto (so-called deterioration at a start-up). More specifically, if the hydrogen front is present in the fuel electrode, the following reactions occur in the oxidant electrode facing a region of the fuel electrode where no hydrogen is present.

Of these reactions, the reaction shown in (1) causes corrosion of a carbon support supporting a catalyst of platinum or the like, thus deteriorating the fuel cell stack. Since this deterioration at the start-up occurs at the system start-up, the degree of deterioration depends on the number of times of start-ups. For this reason, a larger number of times of start-ups induce larger degree of deterioration.

In view of a point that the presence of oxygen in both the oxidant electrode and the fuel electrode causes the deterioration at the start-up, it is conceivable that the deterioration at the start-up is suppressed by performing some treatments during the system shutdown in preparation for the next system start-up. Thus, control is well-known in which the air present in the oxidant electrode of the fuel cell stack is consumed through system shutdown processes in order to reduce the air transmitted from the oxidant electrode to the fuel electrode during the system shutdown. Moreover, a conventional method is known in which the fuel electrode of the fuel cell stack is supplied with hydrogen during the system shutdown on condition that the hydrogen concentration of the fuel electrode is reduced, in order to set the fuel electrode of the fuel cell stack in a hydrogen atmosphere during the system shutdown.

In the meantime, with the latter method, hydrogen needs to be supplied during the system shutdown in accordance with the hydrogen concentration of the fuel electrode of the fuel cell stack. Thus, a controller and a detector which monitors the hydrogen concentration need to be activated, raising a problem of a decrease in system efficiency. Moreover, since hydrogen is supplied in accordance with a reduction in hydrogen concentration, this results in an increase of the amount of hydrogen consumption. Further, there is a problem that a longer system shutdown period induces larger deterioration during a leaving period.

Here, the deterioration during the leaving period represents deterioration of the fuel cell stack attributable to hydrogen peroxide generated by the reaction of oxygen and hydrogen when oxygen enters the fuel electrode during the system shutdown period under a state where hydrogen is present in the fuel electrode. More specifically, many dissociatively-adsorbed hydrogen species are present on an electrode catalyst (platinum) in the fuel electrode in which the electrode oxidation reaction of hydrogen progresses. When oxygen acts thereon, hydrogen peroxide is generated as shown by the following reaction.

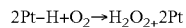

The hydrogen peroxide thus generated reacts with an extremely minute amount of metallic ion, which is an impurity, and is thereby changed to extremely highly oxidative radical chemical species.

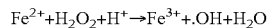

If the radical chemical species (.OH) is in contact with the electrolyte membrane for a long time, the electrolyte membrane may possibly be deteriorated. The degree of this deterioration during the leaving period becomes larger as a leaving period, that is, a length of time elapsed since the system shutdown gets longer.

Figure 3:
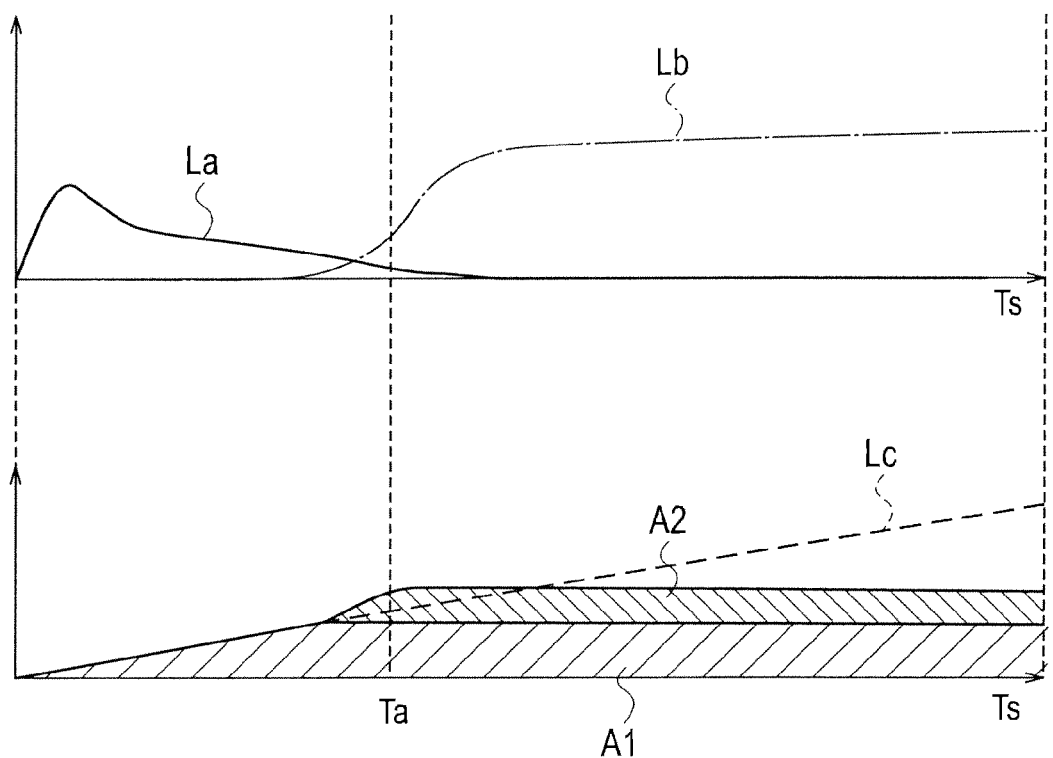
[FIG. 3]

FIG. 3 is a diagram illustrating a relation among a leaving period (i.e., corresponding to a system shutdown period) Ts, a gas concentration, and the degree of deterioration. In FIG. 3, La indicates the transition of a hydrogen concentration in the fuel cell stack 1 and Lb indicates that of an oxygen concentration in the fuel cell stack 1. A1 indicates the degree of the deterioration during the leaving period and A2 indicates the degree of the deterioration at the start-up. Further, Lc indicates the degree of the deterioration during the leaving period according to a conventional method.

According to this embodiment, medium pressure hydrogen is supplied to the fuel electrode of the fuel cell stack 1 through the bypass passage L2 for a predetermined period after the timing of the system shutdown, i.e., the end timing of the shutdown processes (in FIG. 3, a length of time until a timing ta). Thereby, oxygen having entered the fuel electrode is consumed by the reaction with hydrogen. Accordingly, an increase of the oxygen concentration of the fuel electrode is suppressed while medium pressure hydrogen held between the medium pressure hydrogen valve 13 and the hydrogen pressure adjustment valve 14 is supplied. Consequently, no problem of a hydrogen front occurs if the system starts up during this period, thus achieving suppression of the deterioration at the start-up.

Further, since hydrogen in the fuel electrode is gradually consumed by oxygen that enters from the outside, the hydrogen concentration of the fuel electrode gradually decreases, and the oxygen concentration thereof starts to increase. Then, the supply of hydrogen to the fuel electrode ends once the amount of hydrogen equivalent to the capacity of the passage located between the medium pressure hydrogen valve 13 and the hydrogen pressure adjustment valve 14 is supplied (timing ta). Then, after the hydrogen concentration reaches zero, the air entering from the outside is introduced to the fuel electrode to replace hydrogen in the fuel electrode with the air. As described above, since the presence of hydrogen in the fuel electrode is suppressed after the end of the supply of medium pressure hydrogen by the air entering from the outside and the end of the supply of hydrogen, deterioration due to the radical chemical species (.OH) is suppressed. Hence, after the timing ta, even if the shutdown period lasts for a long time, the deterioration during the leaving period can be suppressed as compared to a case where hydrogen is continuously supplied as in the conventional method.

Figure 4:
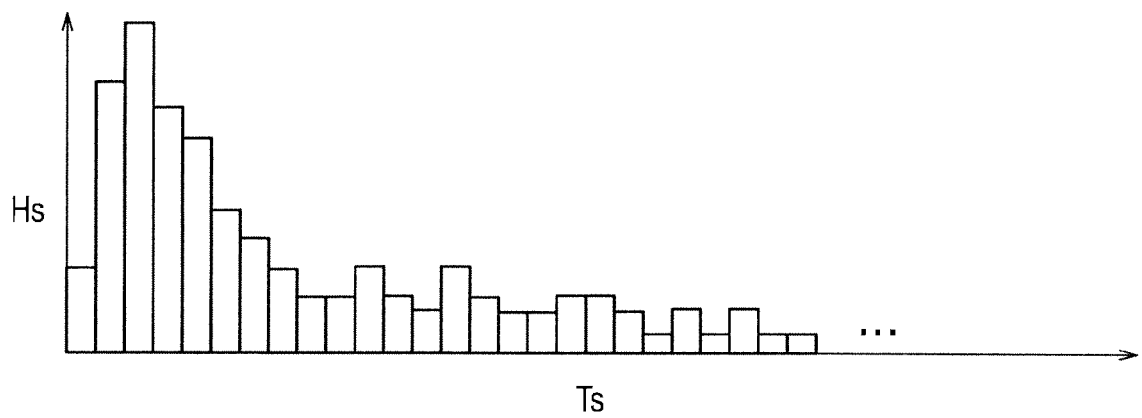
[FIG. 4]

Here, FIG. 4 is a diagram illustrating a system leaving period and system start-up frequency. In FIG. 4, Ts is a leaving period, and represents a longer leaving period in its arrow direction. Further, Hs is the number of times of start-ups, and represents a larger number of times of start-ups in its arrow direction. As shown in FIG. 4, the start-up frequency corresponding to a short leaving period such as a period for a break, shopping, and meal is high; the start-up frequency corresponding to a long leaving period such as a period during work and nighttime parking is low.

Since the deterioration at the start-up depends on the number of times of start-ups, in the case of the short leaving period whose start-up frequency is high (in a range where the system shutdown period is short), it is effective to suppress the deterioration at the start-up by suppressing an increase of the oxygen concentration of the fuel electrode. Although the deterioration during the leaving period needs to be suppressed even in the case of the short leaving period, suppressing the deterioration at the start-up is considered to be more advantageous than suppressing the deterioration during the leaving period because the degree of the deterioration during the leaving period is small in the case of the short leaving period. On the other hand, since the deterioration during the leaving period depends on the length of a leaving period, in the case of the long leaving period (in a range where the system shutdown period is long), it is effective to suppress the deterioration during the leaving period by suppressing the presence of hydrogen in the fuel electrode. Although the deterioration at the start-up needs to be suppressed even in the case of the long leaving period in consideration of the next start-up, suppressing the deterioration during the leaving period is considered to be more advantageous than suppressing the deterioration at the start-up because the start-up frequency corresponding to the long leaving period is low and the degree of the deterioration at the start-up is small in the long leaving period.

As a result of the study of the environment inside the fuel cell stack 1 (fuel electrode) after system shutdown in chronological order from the viewpoint of these deterioration factors, it is preferable to suppress an increase in oxygen concentration in the range where the system shutdown period is short, and to suppress the presence of hydrogen in the range where the system shutdown period is long. To achieve this, in this embodiment, medium pressure hydrogen is supplied in the range where the system shutdown period is short, and the supply of medium pressure hydrogen is terminated in response to the start of the long system shutdown period (in other words, the end of the short system shutdown period), as has been illustrated in the explanation of the configuration and operation described above. This enables suppressing a larger factor causing deterioration between the deterioration at the start-up and the deterioration during the leaving period depending on the length of the system shutdown period. Thereby, the deterioration at the start-up and the deterioration during the leaving period can be suppressed in a good balance.

Here, a total amount of medium pressure hydrogen held is as large as the amount with which hydrogen can be supplied from the bypass passage L2 for a predetermined period after the system shutdown timing. The predetermined period is determined according to the capacity of the passage located between the medium pressure hydrogen valve 13 and the hydrogen pressure adjustment valve 14 (hydrogen holding capacity), and the hydrogen holding capacity (predetermined period) is determined on the basis of the start-up frequency corresponding to the system shutdown period (leaving period). More specifically, from the viewpoint that the deterioration at the start-up should be suppressed in the area where the start-up frequency is high (the range where the system shutdown period is short) and the deterioration during the leaving period should be suppressed in the area where the start-up frequency is low (the range where the system shutdown period is long), the hydrogen holding capacity is set on the basis of the tendency of the start-up frequency and the leaving period shown in FIG. 4. In other words, set as the hydrogen holding amount is the amount of medium pressure hydrogen large enough to be supplied in the range where the system shutdown period can be regarded as short after the system shutdown. Thereby, the deterioration at the start-up and the deterioration during the leaving period can be suppressed in a good balance.

Further, according to this embodiment, the flow rate limitation means 15 is provided in the bypass passage L2. The flow rate limitation means 15 can limit the flow rate of hydrogen supplied through the bypass passage L2 to a small amount. Thereby, the peak of the hydrogen concentration in the fuel cell stack 1 during the system leaving period can be reduced. The reduction of the peak of the hydrogen concentration enables suppressing the amount of hydrogen transmitted from the fuel electrode to the oxidant electrode during the system shutdown. This enables suppressing the flow rate of the air for dilution required at the start-up, consequently enabling the suppression of the power consumption of the compressor 20 as well as the suppression of noise and vibration.

Further, the flow rate of hydrogen allowed by the flow rate limitation means 15 is set equal to or smaller than a minimum flow rate of hydrogen that the fuel cell stack 1 consumes during the system operation. This enables preventing a situation where excess hydrogen is supplied to the fuel electrode through the bypass passage L2 during the system operation. Accordingly, deterioration of fuel economy and deterioration of the pressure adjusting performance of the hydrogen pressure adjustment valve 14 can be suppressed.

Figure 5:
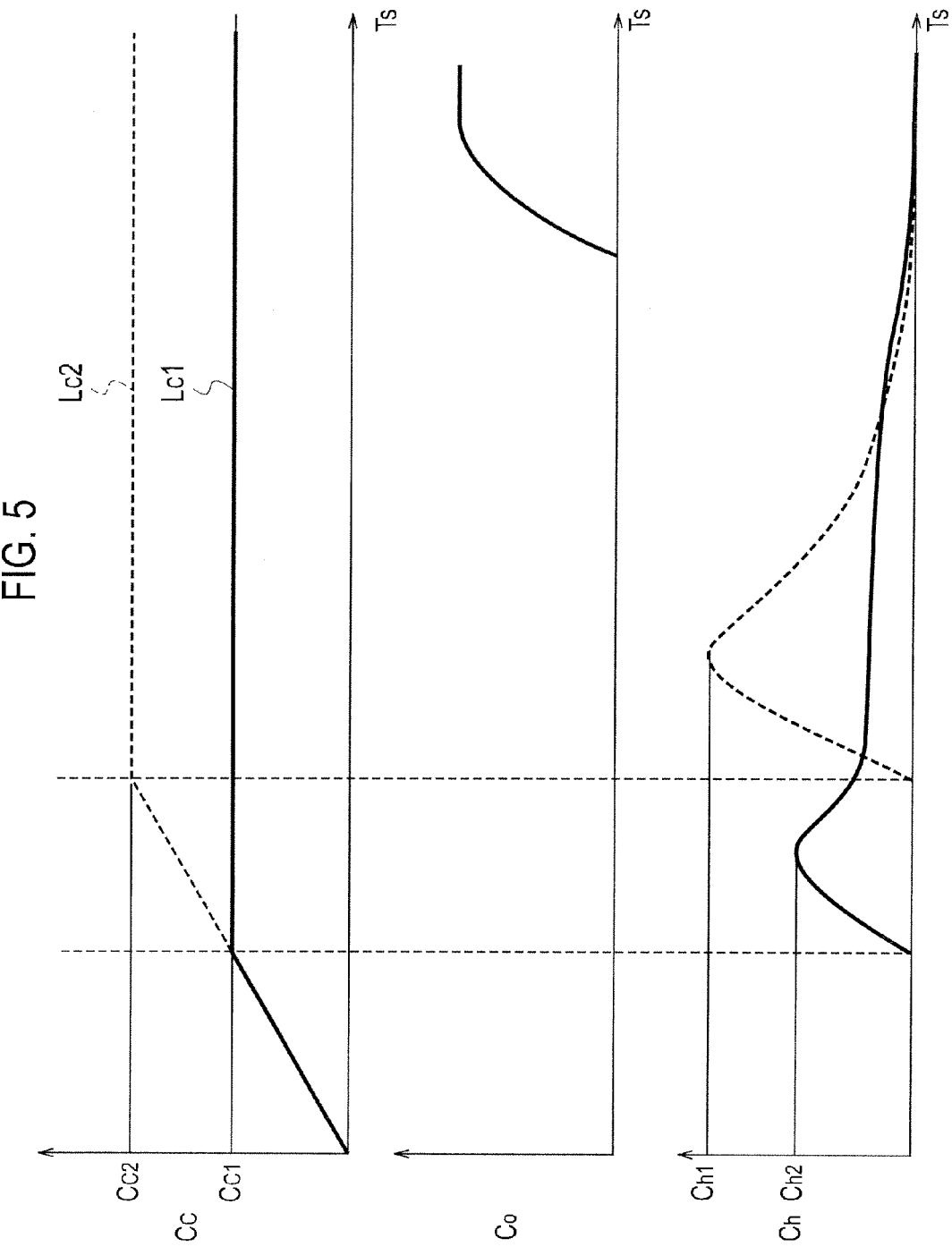
[FIG. 5]

FIG. 5 is a diagram illustrating the transition of the amount of electric charge consumption Cc, that of the oxygen concentration Co in the fuel cell stack 1, and that of the hydrogen concentration Ch in the fuel electrode. In this embodiment, in the oxygen consumption control, the amount of electric charge consumption (criterion value) for judging the end timing of the extraction of current is set to a smaller value as a total amount of medium pressure hydrogen supplied during the system leaving period is larger. For example, the amount of electric charge consumption Cc1 in a scene Lc1 where the total amount of medium pressure hydrogen is large is set to a value smaller than the amount of electric charge consumption Cc2 in a scene Lc2 where the total amount of medium pressure hydrogen is small. This is due to the following reasons. If the total amount of medium pressure hydrogen is large, even if oxygen in the oxidant electrode is not completely consumed through the oxygen consumption control and if residual oxygen is transmitted to the fuel electrode, this is consumed by the reaction with hydrogen and thus there is no possibility of causing a problem of the deterioration at the start-up. Furthermore, even if hydrogen is consumed through this reaction, the amount of hydrogen required for the suppression of the deterioration at the start-up can be supplied to the fuel electrode as long as the total amount of medium pressure hydrogen reserved is sufficient.

Thereby, the amount of electric charges consumed through the oxygen consumption control is smaller when the total amount of medium pressure hydrogen is larger. This enables shortening a length of time required for the oxygen consumption control, and thus shortening a length of time required for the shutdown processes. Moreover, the supply of medium pressure hydrogen can be started at an earlier timing when the total amount of medium pressure hydrogen is larger. This enables terminating the supply of medium pressure hydrogen at the same timing regardless of the size of the total amount of medium pressure hydrogen. Further, the peak of the hydrogen concentration Ch in the fuel electrode can be lowered from the concentration Ch1 to the concentration Ch2 when the total amount of medium pressure hydrogen is larger. This enables suppressing the flow rate of the air for dilution required at the start-up, thus enabling the suppression of the power consumption of the compressor 20 and the suppression of noise and vibration.

As described above, the termination of the oxygen consumption control in this embodiment is judged on the basis of the amount of electric charge consumption. Accordingly, although the oxygen consumption control is terminated, if executed to the maximum extent, in the state where oxygen in the oxidant electrode is completely consumed, the termination also includes the termination at a prior timing, i.e., in the state where oxygen is still left in the oxidant electrode.

Figure 6:
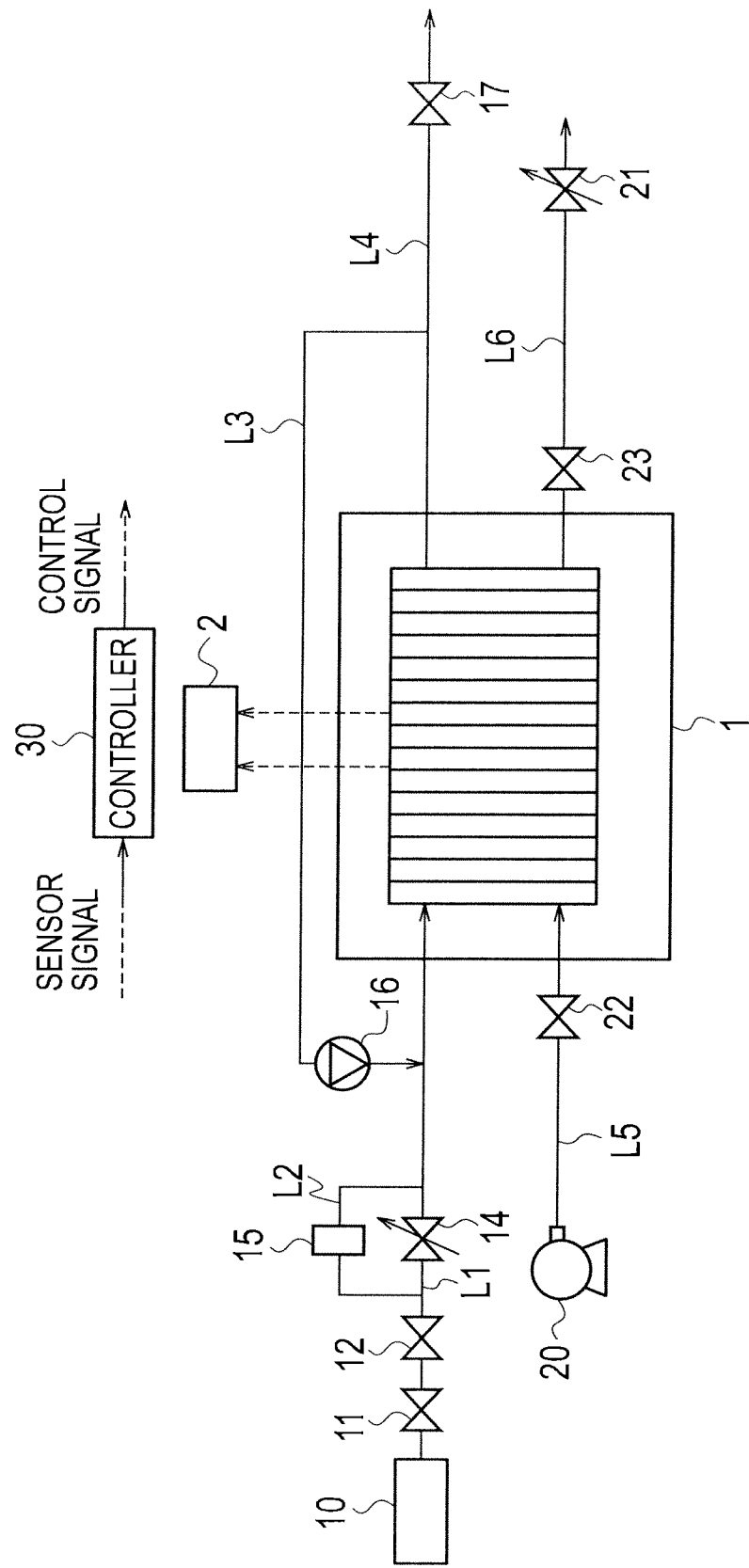
[FIG. 6]

FIG. 6 is a block diagram schematically showing a modified example of the fuel cell system according to the first embodiment. The configuration of a fuel cell system shown in FIG. 6 is different from the above configuration in a configuration for holding medium pressure hydrogen. First, in this modified example, the medium pressure hydrogen valve 13 is omitted. In other words, in this embodiment, the tank main valve 11 serves as the medium pressure hydrogen valve 13 shown in the above embodiment.

This configuration also exhibits the same effect as that of the first embodiment, and enables reducing the number of components.

Figure 7:
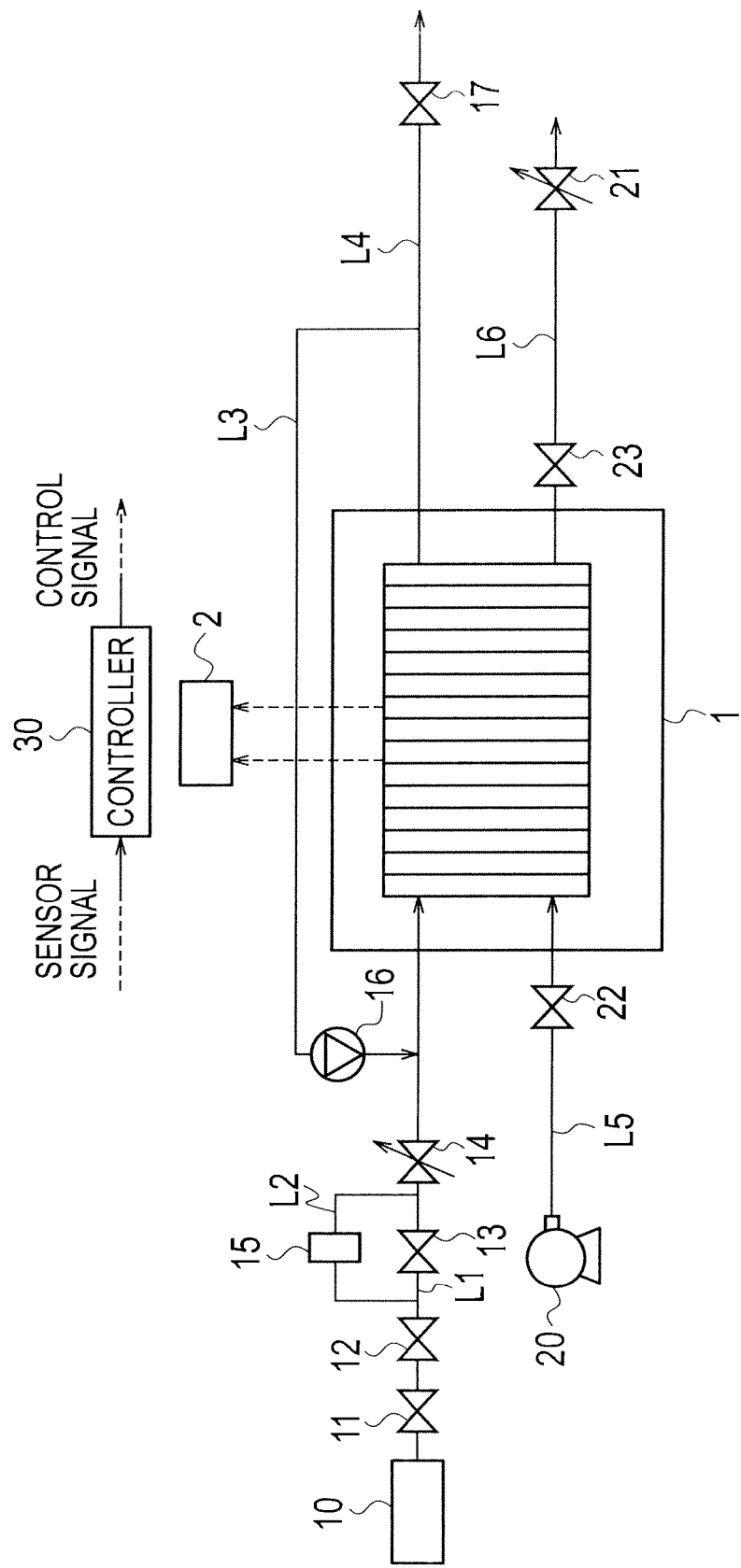
[FIG. 7]

FIG. 7 is a block diagram schematically showing another modified example of the fuel cell system according to the first embodiment. The configuration of a fuel cell system shown in FIG. 7 is different from the above configuration in a configuration for holding medium pressure hydrogen. First, in this modified example, one end of the bypass passage L2 is connected to the fuel supply passage L1 at a position between the pressure reducing valve 12 and the medium pressure hydrogen valve 13, and the other end of the bypass passage L2 is connected to the fuel supply passage L1 at a position between medium pressure hydrogen valve 13 and the fuel cell stack 1. In other words, in this embodiment, the tank main valve 11 serves as the medium pressure hydrogen valve 13 shown in the first embodiment and the medium pressure hydrogen valve 13 serves as the hydrogen pressure adjustment valve 14 shown in the first embodiment. Further, in the process of closing the valves of Step 6 in this case, control to set the hydrogen pressure adjustment valve 14 in a closed state is not performed but control to set the valve 14 in an open state is performed.

This configuration also exhibits the same effect as that of the first embodiment, and enables reducing the number of components.

(Second Embodiment)

Figure 8:
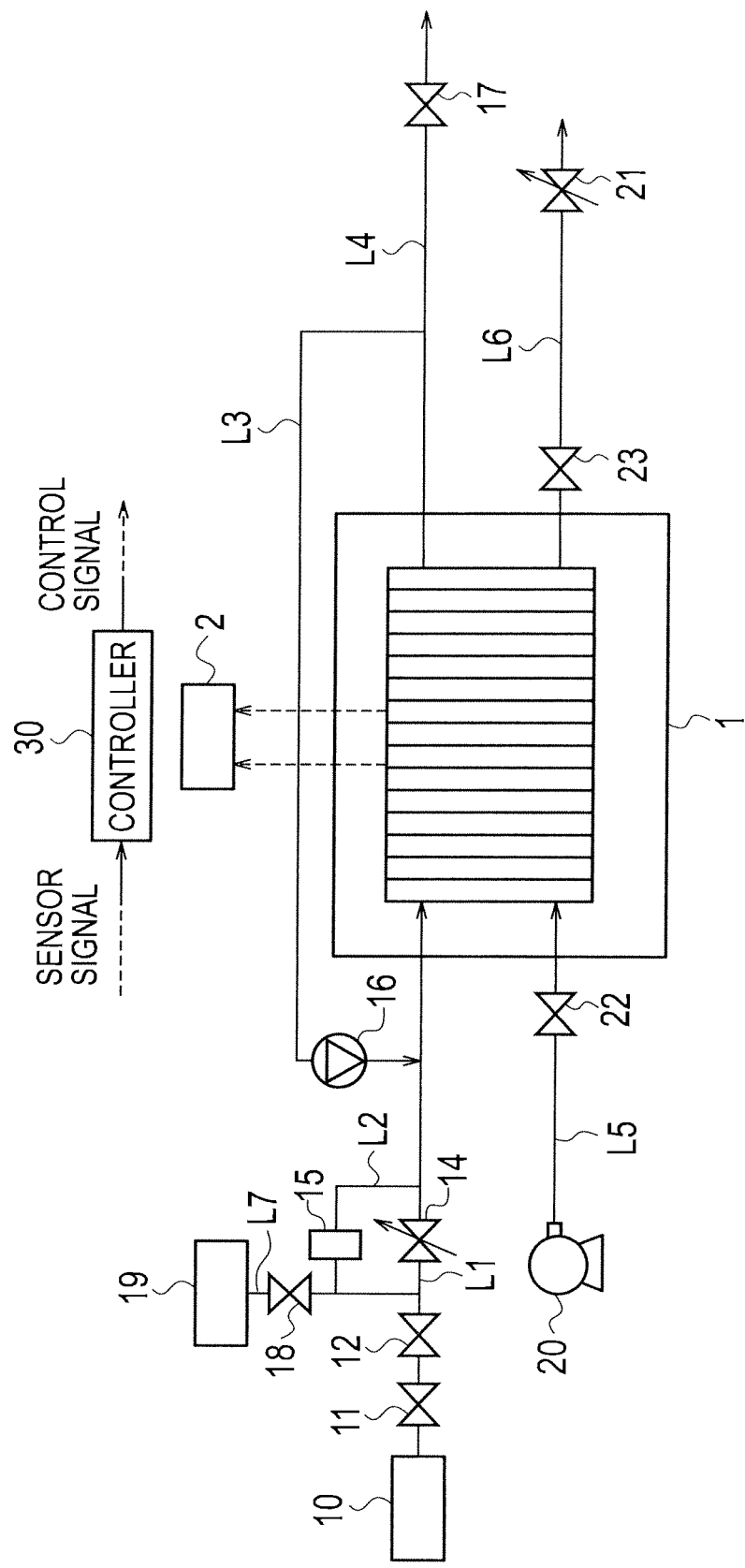
[FIG. 8]

FIG. 8 is a block diagram schematically showing the configuration of a fuel cell system according to a second embodiment. The fuel cell system according to the second embodiment is different from that of the first embodiment in that the system includes buffer means for holding medium pressure hydrogen. Note that, the configuration that overlaps with that of the first embodiment is omitted while the reference numeral of the overlapping configuration is cited, and description is given mainly of differences below.

The medium pressure hydrogen valve 13 shown in the first embodiment is omitted in the hydrogen system of this embodiment. In other words, in this embodiment, the tank main valve 11 serves as the medium pressure hydrogen valve 13 shown in the first embodiment. Further, a tank 19 (buffer means) which includes a capacity part reserving hydrogen is connected to the bypass passage L2 through a connection passage L7. An open/close valve 18 which changes the open/closed state of the passage is provided in the connection passage L7.

In the fuel cell system of the above configuration, the controller 30 is different from that of the above-mentioned first embodiment in the following points. Specifically, the controller 30 performs control to set the open/close valve 18 in a closed state during the system operation. The controller 30 also changes the state of the open/close valve 18 to an open state only for a predetermined length of time as needed to refill the tank 19 with hydrogen. A preferable timing of refilling the tank 19 with hydrogen is a timing at which the refilling of hydrogen should not interfere with the supply of hydrogen to the fuel cell stack 1, such as during steady operation with little load fluctuation or during idle operation, for example.

Further, in the process of closing the valves in Step 6, the controller 30 performs control to set the open/close valve 18 in an open state in conjunction with the timing at which the controller 30 performs control to set the tank main valve 11 and the hydrogen pressure adjustment valve 14 in a closed state.

As described above, this embodiment exhibits the same effect as the first embodiment. Furthermore, as compared to the first embodiment, the amount of medium pressure hydrogen equivalent to the capacity of the tank 19 can be held. This enables holding a required amount of medium pressure hydrogen without extending the length of the hydrogen supply passage L1.

The fuel cell system and the method of controlling the same according to the embodiments of the present invention have been described thus far. However, the present invention is not limited to the above embodiments, and can be modified in various ways within the scope of the invention.

The above embodiment employs such a configuration that hydrogen located between the medium pressure hydrogen valve 13 and the hydrogen pressure adjustment valve 14 is supplied through the bypass passage L2. However, the present invention is not limited to this configuration. Specifically, any configuration may be employed as long as the employed configuration enables supplying, during the system shutdown period, the above limited flow rate of medium pressure hydrogen located between the medium pressure hydrogen valve 13 and the hydrogen pressure adjustment valve 14, the above limited flow rate specifically denoting the flow rate limited to be equal to or smaller than the minimum flow rate of hydrogen that the fuel cell stack 1 consumes during the system operation. Hydrogen can be supplied through an opening of the hydrogen pressure adjustment valve 14 also during the system shutdown period by limiting a minimum opening degree of a fuel adjustment valve (the hydrogen pressure adjustment valve 14, for example) in such a way that the flow rate equal to or smaller than the limited flow rate may be allowed in the fuel adjustment valve, the fuel adjustment valve provided in the hydrogen supply passage L1 downstream of the medium pressure hydrogen valve 13 and whose opening area can be set as desired. In other words, when the system is to be shut down, the controller 30 performs control to set the medium pressure hydrogen valve 13 in a closed state and performs control to set the hydrogen pressure adjustment valve 14 to have a predetermined opening area (i.e., such a minimum opening degree that allows the flow rate equal to or smaller than the limited flow rate).

Further, according to this embodiment, the supply of medium pressure hydrogen does not end with the active control of the controller 30 itself, but ends naturally once the amount of hydrogen equivalent to the capacity of the passage located between the medium pressure hydrogen valve 13 and the hydrogen pressure adjustment valve 14 is supplied. However, according to the present invention, the control of the termination of the fuel gas supply performed by control means includes in the broad sense: a mode where the gas supply ends depending on the amount of the gas as described above, i.e., where no control is performed for termination of the gas supply, and a mode where control is performed such that a predetermined amount of medium pressure hydrogen may be held through the shutdown processes in anticipation of future termination of the gas supply.

Further, in view of the above point, the control of the termination of the fuel gas supply according to the present invention also includes such a mode that the control means actively terminates the fuel gas supply to the fuel electrode after a lapse of a predetermined period since the termination of the shutdown processes. Specifically, the control means may actively terminate the fuel gas supply during the system shutdown by being triggered by a lapse of a predetermined period by using a timer or the like. This mode also enables suppressing a decrease in system efficiency as compared with the conventional method because no troublesome process is required such as executing the monitoring of a hydrogen concentration and executing hydrogen supply/shutoff operations in accordance with the hydrogen concentration. Note that, the active termination of the hydrogen supply by the control means is possible by providing open/close means downstream of the flow rate limitation means 15 and performing control to set the open/close means in a closed state. Alternatively, in a mode where medium pressure hydrogen is supplied during the system shutdown by using the fuel adjustment valve whose opening area can be set as desired, the active termination of the hydrogen supply by the control means is possible by performing control to set the fuel adjustment valve in a fully closed state.

Industrial Applicability

The fuel cell system and the method of controlling the same according to the present invention are not limited to a case where the system is mounted on and used in a vehicle as energy source, but can be used in wide applications such as in a fixed-type fuel cell system.

Reference Signs List

1 fuel cell stack
2 output extraction device
10 fuel tank
11 tank main valve
12 pressure reducing valve
13 medium pressure hydrogen valve
14 hydrogen pressure adjustment valve
15 flow rate limitation means
16 hydrogen circulation pump
17 purge valve
18 open/close valve
19 tank
20 compressor
21 air pressure adjustment valve
22 shutoff valve
23 shutoff valve
30 controller

The invention claimed is:
1. A fuel cell system comprising:
a fuel cell configured to generate electric power by making a fuel gas supplied to a fuel electrode and an oxidant gas supplied to an oxidant electrode electrochemically react with each other;
a fuel gas supply unit configured to supply the fuel electrode with the fuel gas through a fuel gas supply passage;
a first open/close device provided in the fuel gas supply passage and configured to change an open/closed state of the fuel gas supply passage;
a second open/close device provided in the fuel gas supply passage at a position downstream of the first open/close device and configured to change an open/closed state of the fuel gas supply passage;
a bypass passage, a first end of which is connected to the fuel gas supply passage at a position between the first open/close device and the second open/close device, and a second end of which is connected to the fuel gas supply passage at a position between the second open/close device and the fuel cell;

a flow rate limitation device provided in the bypass passage and configured to limit a flow rate of the gas flowing through the bypass passage; and a controller configured to execute, in shutdown of a system, a shutdown process in which gas consumption control is such that the oxidant gas in the oxidant electrode is consumed in a state where supply of the oxidant gas to the oxidant electrode of the fuel cell is shut off while the fuel gas is supplied to the fuel electrode of the fuel cell, and to set the first open/close device and the second open/close device in a closed state after termination of the gas consumption control, to execute control such that the fuel gas held between the first open/close device and the second open/close device is supplied to the fuel electrode through the bypass passage after termination of the shutdown process, and to execute control such that supply of fuel gas to the fuel electrode is terminated after a lapse of a predetermined period since the termination of the shutdown process.

2. The fuel cell system according to claim 1, wherein the second open/close device is configured to set an opening area as desired, and wherein, during the shutdown process, the controller is configured to set the first open/close device in a closed state and to set the second open/close device to have a predetermined opening area after termination of the gas consumption control.

3. The fuel cell system according to claim 1, further comprising:

a current extraction unit configured to extract current from the fuel cell, wherein the controller is configured to execute the gas consumption control by extracting current from the fuel cell through the current extraction unit.

4. The fuel cell system according to claim 3, wherein the controller is configured to set a criterion value of electric charge consumption corresponding to a total amount of fuel gas held between the first open/close device and the second open/close device for judging an end timing of the extraction of current, and wherein the criterion value is set smaller as the total amount of the fuel gas becomes larger.

5. The fuel cell system according to claim 3, further comprising:

a buffer connected to the bypass passage and including a capacity part which reserves the fuel gas; and a third open/close device provided in a passage which connects the bypass passage and the buffer to each other and configured to change an open/closed state of the passage, wherein the controller is configured to execute the open/closed state of the third open/close device to refill the buffer with the fuel gas during system operation, and the controller is configured to perform control to set the third open/close device in an open state after the termination of the gas consumption control in response to a timing at which control is performed to set the first open/close device and the second open/close device in a closed state.

6. A method of controlling a fuel cell system including:

a fuel cell configured to generate electric power by making a fuel gas supplied to a fuel electrode and an oxidant gas supplied to an oxidant electrode electrochemically react with each other;

a fuel gas supply unit configured to supply the fuel electrode with the fuel gas through a fuel gas supply passage;

a first open/close device provided in the fuel gas supply passage and configured to change an open/closed state of the fuel gas supply passage;

a second open/close device provided in the fuel gas supply passage at a position downstream of the first open/close device and configured to change an open/closed state of the fuel gas supply passage;

a bypass passage, a first end of which is connected to the fuel gas supply passage at a position between the first open/close device and the second open/close device, and a second end of which is connected to the fuel gas supply passage at a position between the second open/close device and the fuel cell;

a flow rate limitation device provided in the bypass passage and configured to limit a flow rate of the gas flowing through the bypass passage, the method comprising:

executing, in shutdown of a system, a shutdown process comprising controlling gas consumption such that the oxidant gas in the oxidant electrode is consumed in a state where the fuel gas is supplied to the fuel electrode of the fuel cell and supply of the oxidant gas to the oxidant electrode of the fuel cell is shut off, and controlling the first and second open/close devices by setting the first open/close device and the second open/close device in a closed state after termination of the controlling of the gas consumption, supplying the fuel gas held between the first open/close device and the second open/close device to the fuel electrode through the bypass passage after termination of the shutdown process, and terminating supply of the fuel gas to the fuel electrode after a lapse of a predetermined period since termination of the shutdown process.

7. A fuel cell system comprising:

a fuel cell configured to generate electric power by making a fuel gas supplied to a fuel electrode and an oxidant gas supplied to an oxidant electrode electrochemically react with each other;

fuel gas supply means configured to supply the fuel electrode with the fuel gas through a fuel gas supply passage; and control means configured to execute, in shutdown of the system, a shutdown process in which gas consumption control is:

A) such that the oxidant gas in the oxidant electrode is consumed in a state where supply of the oxidant gas to the oxidant electrode of the fuel cell is shut off, while the fuel gas is supplied to the fuel electrode of the fuel cell, and the fuel gas is controlled so as to hold the fuel gas in the fuel gas supply passage and to shut off the supply of the fuel gas from the fuel gas supply means after termination of the gas consumption control, B) such that the fuel gas held in the fuel gas supply passage is supplied to the fuel electrode through a bypass passage after termination of the shutdown process, and C) such that supply of the fuel gas held in the fuel gas supply passage to the fuel electrode is terminated after a lapse of a predetermined period since termination of the shutdown process.

* * * * *